July 19, 1966     J. P. MALEC     3,261,146
AIR FILTER APPARATUS FOR REMOVING MOISTURE AND FOREIGN
MATTER FROM COMPRESSED AIR
Filed April 24, 1963     3 Sheets-Sheet 1

INVENTOR.
JERRY P. MALEC
BY
Dick, Zarley & Henderson
ATTORNEYS

WITNESS
NORMAN G. TRAVISS

July 19, 1966 J. P. MALEC 3,261,146
AIR FILTER APPARATUS FOR REMOVING MOISTURE AND FOREIGN
MATTER FROM COMPRESSED AIR
Filed April 24, 1963 3 Sheets-Sheet 2

INVENTOR.
JERRY P. MALEC
BY
Dick, Zarley & Henderson
ATTORNEYS

WITNESS
NORMAN G. TRAVISS

INVENTOR.
JERRY P. MALEC

United States Patent Office 3,261,146
Patented July 19, 1966

3,261,146
AIR FILTER APPARATUS FOR REMOVING MOISTURE AND FOREIGN MATTER FROM COMPRESSED AIR
Jerry P. Malec, Omaha, Nebr., assignor to Comet Industries, Inc., Omaha, Nebr.
Filed Apr. 24, 1963, Ser. No. 275,427
11 Claims. (Cl. 55—218)

This invention relates generally to an apparatus for filtering air under pressure and more particularly to an apparatus for removing moisture and foreign matter therewith from compressed air as it is transmitted between a source of compressed air and the point of use.

It is an object of this invention to provide an improved air filter apparatus.

It is another object of this invention to provide an air filter apparatus wherein the air is filtered of moisture without losing too much pressure head.

Yet another object of this invention is the provision of an air filter apparatus for automatically continuously discharging the trapped water condensate.

A further object of this invention is the provision of an air filter wherein the trapped condensate is permitted to bleed out continuously without losing substantial pressure head.

It is another object of this invention to provide an improved air filter wherein a chamber for retaining entrapped fluid and other foreign matter is self-cleaned in response to shutting off the flow of air under pressure through the filter.

A further object of this invention is to provide an air filter wherein a resilient element is utilized in a novel manner for mechanical purposes.

Still another object of this invention is to provide an improved air filter capable of attaining the above designated objectives while being economical, simple, and efficient.

These objects and other features and advantages of this invention will become readily apparent upon reference to the following description when taken in conjunction with the accompanying drawings, wherein.

Figure 1:
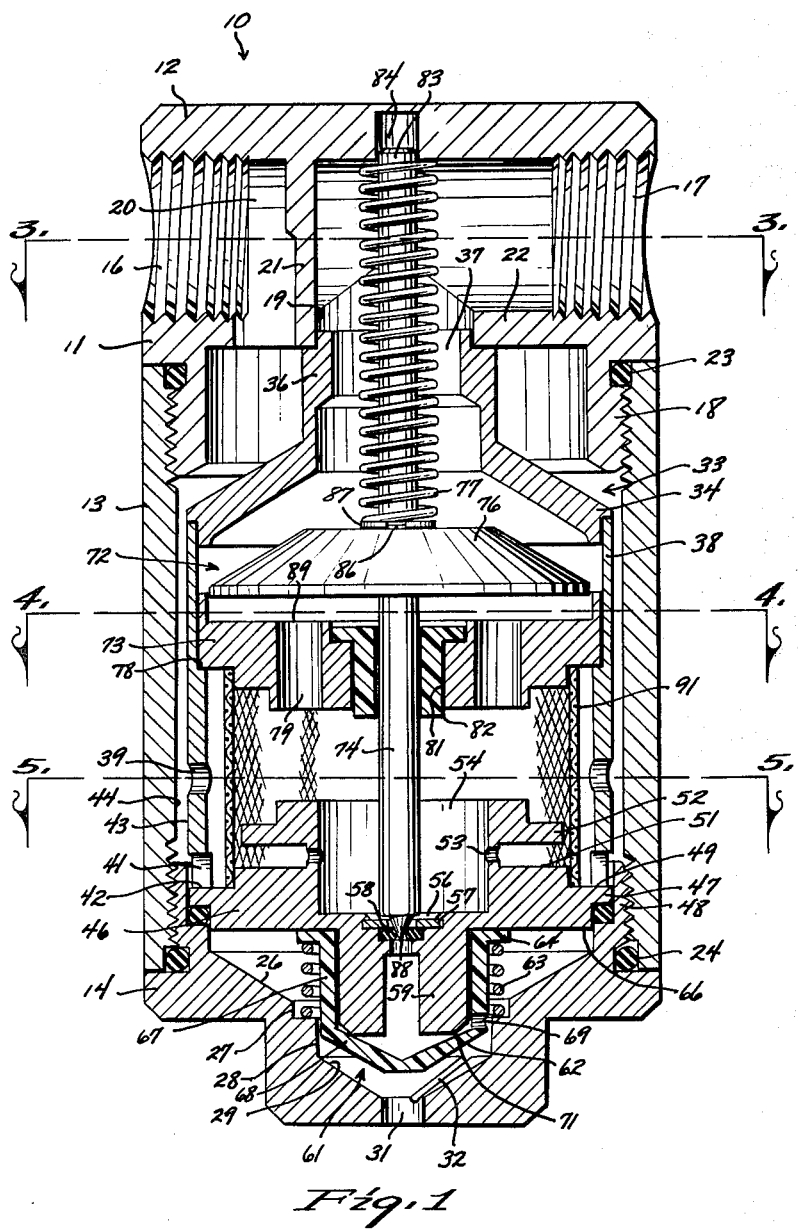
FIG. 1 is a sectional view of the air filter apparatus of this invention taken substantially along the longitudinal axis of the apparatus, the parts being shown in their normal inoperative positions.

Referring to the drawings, the air filter apparatus of this invention is indicated generally at 10 in FIG. 1. It comprises an enclosed cylinder 11 including a top cap 12, a cylindrical body 13, and a lower cap 14, all of which are threaded together to form a unit as best indicated in FIG. 1.

Figure 3:
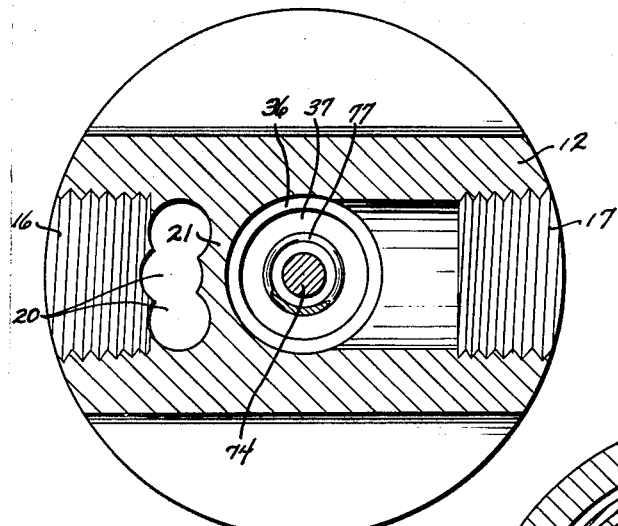
FIG. 3 is a sectional view taken along the line 3—3 in FIG. 1.

The top cap 12 has a threaded inlet opening 16 (FIG. 3) for fluid connection with a source of compressed air, an outlet opening 17 for fluid communication with a point of use, and includes an externally threaded collar 18. A plurality of interconnected holes 20 lead from the inlet opening 16 to the interior of the collar 18. A large bore 19 is defined by one lower edge of a wall 21 separating the inlet opening 16 from the outlet opening 17 and by the inner end of a horizontal wall 22.

An O-ring seal 23 (FIG. 1) is interposed between the threaded connection of the top cap 12 and the body 13, and another O-ring seal 24 is provided between the body 13 and the lower cap 14. Internally, the lower cap 14 has an inverted conical shaped upper surface 26, a shoulder 27, a circular wall 28, and an inverted conical shaped lower surface 29 with a discharge opening 31 formed at the apex thereof. A canal 32 is formed in the surface 29 and extends between the upper edge thereof and the discharge opening.

Mounted internally of the cylinder 11 and along its longitudinal axis is a baffle assembly indicated generally at 33 in FIG. 1. The baffle assembly 33 includes a circular element 34 with its upper end 36 seated against the walls 21 and 22 and having a bore 37 formed therein also disposed on the longitudinal axis of the cylinder 11. Disposed below the element 34 is a barrel 38 in which is formed a plurality of arcuately spaced upper holes 39 (FIG. 5) and with a plurality of lower holes 41 being formed in the bottom edge 42 of the barrel 38. The outer wall surface 43 of the barrel is spaced inwardly from the inner surface 44 of the body 13.

Disposed immediately below and in contacting relation with the barrel bottom edge 42 is a bottom baffle 46. This baffle 46 includes a circular ledge 47 which extends into contacting relation with an externally threaded ring portion 48 of the lower cap 14. The upper surface 49 of the ledge 47 is disposed immediately below the holes 41 and helps to form a means for directing moisture through the holes 41 and onto a surface 51 of the baffle 46.

This surface 51 (FIG. 1) leads inwardly beneath a shelf 52 to a plurality of arcuately spaced apertures 53 which lead to a chamber 54. The chamber 54 is open to the interior of the baffle assembly 33 and has an outlet port 56 formed in the baffle 46. A valve seat 57 is mounted in the port 56 as is an O-ring 58. Integral with and disposed below the baffle is a guide projection 59 for a first valve unit 61.

The valve unit 61 (FIG. 1) includes a cup-shaped valve 62 of Delrin or the like, and a coil spring 63. The valve 62 has an upper shoulder 64 adapted to seat against the under surface 66 of the baffle 46, a circular body 67 reciprocally embracing the guide projection 59, and a lower wall 68 shaped similarly to the lower surface 29 of the lower cap 14. A passage 69 is formed in the body 66. The spring 63 is compressed between the upper shoulder 64 and the shoulder 27 of the lower cap 14, and biases the valve 62 to a position best illustrated in FIG. 1 wherein the valve 62 engages the lower corner surfaces 71 of the guide projection to obstruct the flow of moisture from the outlet port 56 to the passage 69.

Figure 4:
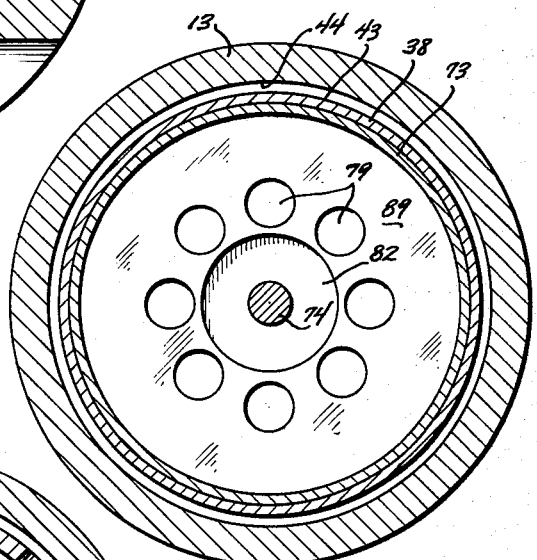
FIG. 4 is a sectional view taken along the line 4—4 in FIG. 1.

A second valve unit is indicated generally at 72 in FIG. 1, and includes a circular guide 73, a reciprocal shaft 74, a circular baffle plate 76, and a coil spring 77. The guide 73 is mounted above the upper holes 39 on an internal shoulder 78 formed on the inner wall surface of the barrel 38 and has a plurality of arcuately spaced passageways 79 (FIG. 4) formed therein. Within a bore 81 formed centrally in the guide 73, a bushing 82 of Delrin or the like is provided for receiving the shaft 74.

Figure 2:
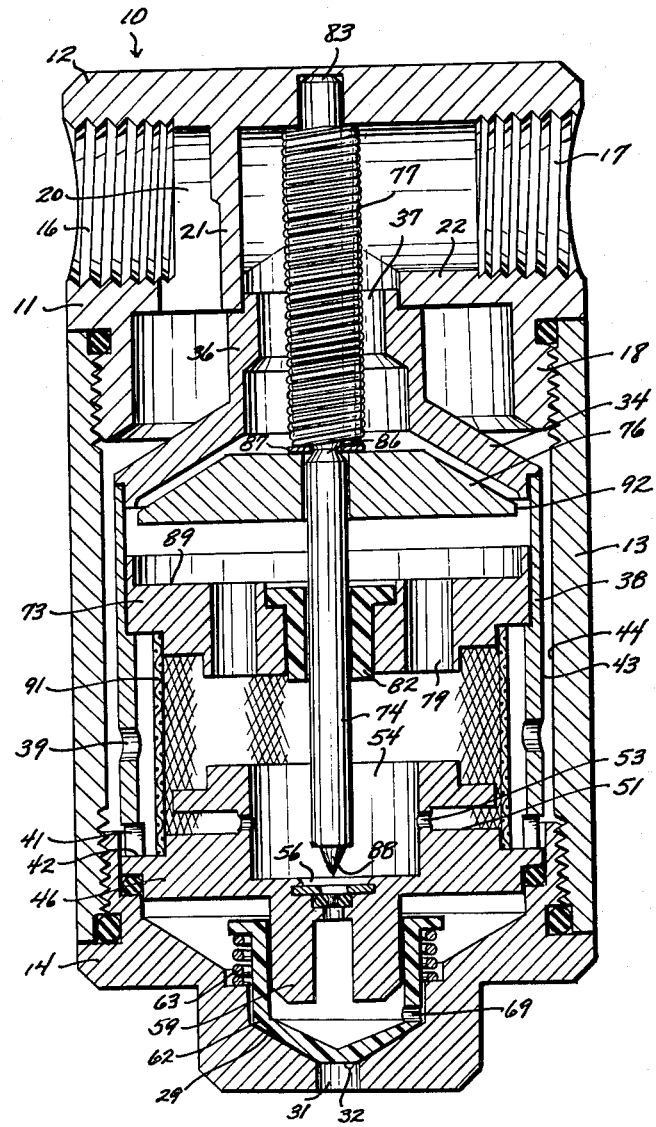
FIG. 2 is a view similar to FIG. 1, and showing the parts in their actuated, operative positions.

The shaft 74 (FIG. 1) has an upper end 83 guidably received in a passage 84 formed in the top cap 12, has a reduced portion 86 (FIG. 2) for receiving a snap ring 87, and has a pointed lower end 88 adapted to seat within the valve seat 57 to close the outlet port 56. The baffle plate 76 is mounted freely on the shaft 74 immediately below the snap ring 87 and is continually biased downwardly by the spring 77 acting against the snap ring 87 and thus against the plate 76.

The shaft 74 and plate 76 are shown in FIG. 1 in a partially closed position, the shaft lower end 88 not quite fully inserted into the valve seat 57, and the plate 76 raised slightly out of a seat 89 provided therefor on the upper side of the guide 73.

Figure 5:
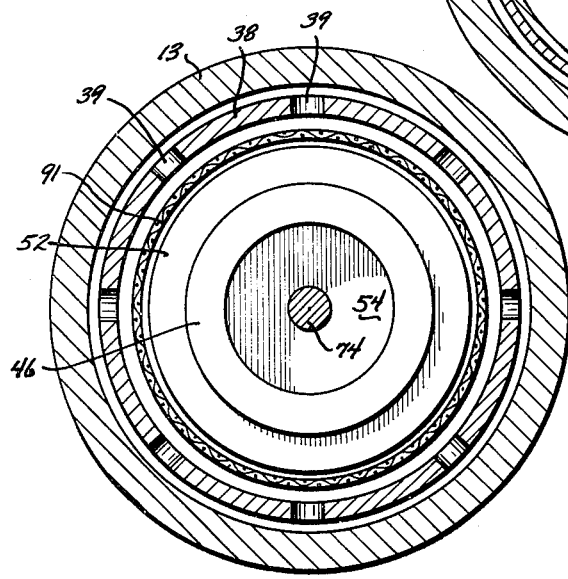
FIG. 5 is a sectional view taken along the line 5—5 of FIG. 1.

Should it be desirable, a cylindrical filter 91 (FIG. 1) can be inserted between the guide 73 and the baffle 46 as best illustrated in FIGS. 1 and 5.

In operation, air under pressure is introduced through the inlet opening 16 and passes through the holes 20 to the collar 18 to impinge against the conical shaped external surface of the circular element 34. The air is then spiraled downwardly in the space between the body 13 and the barrel 38 where it is forced through the upper holes 39, through the filter 91 and into the interior of the barrel 38. Then the air passes upwardly through the passageways 79 in the guide 73 and against the baffle plate 76.

Upon impinging against the baffle plate 76 the air forces it and the shaft 74 upwardly via the snap ring 87 (see FIG. 2) against the bias of the spring 77. Should the spring be completely compressed, it will act as a mechanical stop to prevent the plate 76 from engaging the circular element 34, whereupon the air passes by the peripheral edge 92 of the plate, between the plate and element, through the bore 37 and out the outlet opening 17.

During this process, as the shaft 74 was initially in its lower position, the valve 62 (FIG. 1) was closed against the guide projection 59 due to the expansion of the spring 63. However, upon being raised, the shaft lower end 88 opens the outlet port 56 permitting compressed air from the interior of the barrel 38 to force the valve 62 downwardly until the spring 63 acts as a mechanical stop and the valve 62 seats against the lower cap lower surface 29.

Moisture and other foreign matter, which collects primarily on the body inner surface 44 and the barrel outer surface 43, flows through the lower holes 41, the baffle apertures 53, and into the chamber 54. Then the fluid flows out of the now open outlet port 56, and into the cup valve 62 from which it flows out through the passage 69 and down the canal 32 to the discharge opening 31. Thus, it may be seen that a constant bleed out of collected moisture is provided while preventing escape of the compressed air in any appreciable amount.

Furthermore upon release or withdrawal of the compressed air, whereupon the expansion of the spring 77 forces, via the snap ring 87, the shaft 74 and the plate 76 downwardly, a self-cleaning of the valve 62 is provided. Subsequent to the outlet port 56 being closed by the shaft end 88, atmospheric pressure through the discharge opening 31 effects, with the aid of the spring 63, a slamming of the valve 62 upwardly against the baffle 46. By this arrangement, all of the condensate and foreign matter within the valve cup 62 is literally blown out through the passage 69 and into the lower cap 14 for draining.

In summation, an improved air filter has been described and disclosed herein wherein air under pressure is filtered without losing too much pressure head, where a constant emission of trapped moisture is provided, and wherein a self-cleaning of the trapping area is provided.

Some changes may be made in the construction and arrangement of my air filter apparatus without departing from the real spirit and purpose of my invention, and it is my intention to cover by my claims, any modified forms of structure or use of mechanical equivalents which may be reasonably included within their scope.

I claim:

1. An air filter apparatus for removing the moisture from compressed air comprising in combination:
an enclosed cylinder having a top wall, a bottom wall, and a side wall, said side wall having an inlet opening formed therein adjacent the top thereof and an outlet opening formed therein arcuately spaced from said inlet opening, said bottom wall having an inverted frusto-conical inner surface with a discharge opening formed centrally therein at the apex thereof, baffle means mounted within said cylinder and including a barrel unit having an upper frusto-conical surface against which air incoming through said inlet opening impinges, said barrel unit having an opening formed in said upper surface fluidly connected to said outlet opening, said barrel unit having a cylindrical wall concentric with said cylinder side wall wherein said incoming air spirals downwardly between said cylinder side wall and barrel cylindrical wall, said barrel cylindrical wall having a plurality of arcuately spaced upper holes formed therein through which the air flows internally of said barrel unit, said barrel cylindrical wall having a plurality of arcuately spaced lower holes formed therein through which moisture is adapted to flow internally of said barrel unit, said baffle means also including a bottom baffle unit secured to the base of said barrel cylindrical wall, said bottom baffle unit having a chamber open to the interior of said barrel unit and for receiving said moisture, and having further an outlet port formed in the bottom thereof;
a first valve means including a cup-shaped valve having an upper ledge disposed against said bottom baffle unit, said first valve having a passage formed therein, and a first spring means compressed between said bottom baffle unit and said bottom wall and biasing said first valve against said bottom baffle unit obstructing thereby said passage, said first valve movable against the bias of said spring means, in response to compressed air internal of said barrel unit, and away from said bottom baffle unit whereby said passage is unobstructed, said passage and said discharge opening being in constant fluid communication when said valve is moved away from said bottom baffle unit; and
a second valve means including a circular guide element mounted within said barrel unit and having a plurality of passageways formed therein for transmitting the air internal said barrel unit through said barrel unit upper opening to said cylinder outlet opening, said guide element having a bore formed centrally therein, a shaft reciprocally inserted through said bore and having a lower end adapted to close said outlet port, a circular baffle plate mounted on said shaft and adapted upon impingement of the compressed air being transmitted to said barrel unit upper opening, to move said shaft in said bore to remove said lower end from said outlet port, and a second spring means embracing said shaft and compressed between said cylinder top wall and said baffle plate, said second spring means biasing said shaft to a position where said lower end closes said outlet port.

2. An air filter apparatus as defined in claim 1 further wherein said cylinder bottom wall has a canal formed in said inner surface leading from the upper edge of said surface to said discharge opening, whereby said discharge opening and said passage are in constant fluid communication irrespective of the position of said first valve means.

3. An air filter apparatus as defined in claim 1 and further wherein said barrel unit is mounted on the longitudinal axis of said cylinder and the upper surface opening thereof is also disposed on said longitudinal axis.

4. An air filter apparatus as defined in claim 1 and further wherein said baffle unit has a ledge disposed immediately below said lower holes and extended laterally to engage the inner surface of said cylinder side wall.

5. An air filter apparatus as defined in claim 1 and further wherein said baffle unit has a body within which said chamber is formed and which has a wall with apertures formed therein for fluid communication with said lower holes, and said body having a shelf extended laterally above said apertures.

6. An air filter apparatus as defined in claim 1 and further wherein said first valve means has a frusto-conical shaped outer bottom surface adapted to seat in a complementary manner against said bottom wall whereby to substantially close said discharge opening when said valve is moved against the bias of said spring means.

7. An air filter apparatus as defined in claim 1 and further wherein said guide element is mounted between said upper holes and said barrel unit upper opening, and with said baffle plate mounted on said shaft between said guide element and said barrel unit upper opening.

8. An air filter apparatus as defined in claim 1 and further wherein said spring means is movable to a compressed position in response to impingement of the compressed air against the lower surface of the baffle plate, with said baffle plate spaced from said barrel unit upper surface.

9. An air filter apparatus as defined in claim 1 and further wherein a circular filter element is mounted within said barrel between said baffle unit and said guide element.

10. An air filter apparatus as defined in claim 1 and further wherein said cylinder bottom wall has a canal formed in said inner surface leading from the upper edge of said inner surface to said discharge opening, whereby said discharge opening and said passage are in constant fluid communication irrespective of the position of said first valve means, and still further wherein said guide element is mounted between said upper holes and said barrel unit upper opening, said baffle plate being mounted on said shaft between said guide element and said barrel unit upper opening.

11. An air filter apparatus as defined in claim 10 and further wherein said second spring means is movable to a compressed position in response to impingement of the compressed air against the lower surface of the baffle plate, said baffle plate having an upper surface formed in a complementary manner relative to the inner surface of said baffle unit upper frusto-conical surface, with said baffle plate upper surface being spaced closely adjacent said barrel unit upper surface in response to said second spring means being in a compressed position.

References Cited by the Examiner
UNITED STATES PATENTS

| | | | |
|---|---|---|---|
| 2,636,571 | 4/1953 | Churchman | 55—218 |
| 2,669,320 | 2/1954 | Shaw | 55—218 |
| 2,822,887 | 2/1958 | Engman | 55—218 |
| 2,958,394 | 11/1960 | Woodmansee | 55—218 |
| 3,093,467 | 6/1963 | McLaughlin | 55—218 |

HARRY B. THORNTON, *Primary Examiner.*

D. TALBERT, L. H. McCARTER, *Assistant Examiners.*